(12) United States Patent
Silberberg (10) Patent No.: US 10,969,213 B1
(45) Date of Patent: Apr. 6, 2021

(54) ARTICULATING LEVEL SYSTEMS (71) Applicant: Mark L. Silberberg, Boerne, TX (US)

(72) Inventor: Mark L. Silberberg, Boerne, TX (US)

( * ) Notice: Subject to any disclaimer, the term of this patent is extended or adjusted under 35 U.S.C. 154(b) by 0 days.

(21) Appl. No.: 16/925,996

(22) Filed: Jul. 10, 2020

Related U.S. Application Data (60) Provisional application No. 62/872,698, filed on Jul. 10, 2019.

(51) Int. Cl.
*G01B 5/24* (2006.01)
*G01C 9/28* (2006.01)
*G01C 9/34* (2006.01)

(52) U.S. Cl.
CPC ............... *G01B 5/24* (2013.01); *G01C 9/28* (2013.01); *G01C 9/34* (2013.01)

(58) Field of Classification Search
CPC ............... G01B 5/24; G01C 9/34; G01C 9/28
USPC .......................................................... 33/343
See application file for complete search history.

(56) References Cited

U.S. PATENT DOCUMENTS

| | | | | |
|---|---|---|---|---|
| 4,394,799 A | * | 7/1983 | Moree | G01C 9/28 33/343 |
| 5,063,679 A | * | 11/1991 | Schwandt | G01C 9/28 33/347 |
| 5,154,000 A | * | 10/1992 | Mahoney | B21D 7/14 33/343 |
| 5,167,075 A | * | 12/1992 | Weldy | G01C 9/34 33/343 |
| 5,768,790 A | * | 6/1998 | Norman | B21D 7/063 33/334 |
| 6,385,856 B1 | * | 5/2002 | Godin | B21D 7/063 33/343 |
| D509,158 S | | 9/2005 | Silberberg | |
| D538,186 S | | 3/2007 | Silberberg | |
| D576,063 S | | 9/2008 | Silberberg | |
| D595,165 S | | 6/2009 | Silberberg | |
| D644,945 S | | 9/2011 | Silberberg | |
| D644,946 S | | 9/2011 | Silberberg | |
| D644,947 S | | 9/2011 | Silberberg | |
| D694,136 S | | 11/2013 | Silberberg | |
| D719,470 S | | 12/2014 | Silberberg | |
| D722,509 S | | 2/2015 | Silberberg | |
| D722,510 S | | 2/2015 | Silberberg | |
| D722,511 S | | 2/2015 | Silberberg | |
| D722,512 S | | 2/2015 | Silberberg | |
| D722,513 S | | 2/2015 | Silberberg | |
| D722,514 S | * | 2/2015 | Silberberg | D10/69 |
| D722,897 S | * | 2/2015 | Silberberg | D10/69 |
| D730,206 S | | 5/2015 | Silberberg | |
| 9,021,710 B2 | | 5/2015 | Silberberg | |

(Continued)

*Primary Examiner* — Yaritza Guadalupe-McCall
(74) *Attorney, Agent, or Firm* — Volk & McElroy, LLP; Michael D. Volk, Jr.

(57) ABSTRACT

A specially designed bubble level having an articulating portion that may be used to verify that an angle made in a tubular structure for example, electrical conduit, is level. The level apparatus of the present disclosure may also be used to verify the angular displacement of the tubular structure about a bend, using a bubble level as reference. The apparatus is particularly useful during manual bending of electrical conduit and similar field-modified tubular structures as the apparatus provides a convenient and readily-discernible indication when a tubular structure that is being bent has been brought to a predetermined bend angle.

12 Claims, 10 Drawing Sheets

(56) References Cited

U.S. PATENT DOCUMENTS

| | | | |
|---|---|---|---|
| 9,151,606 B2 | 10/2015 | Silberberg | |
| 9,360,315 B2 * | 6/2016 | Silberberg | G01C 9/28 |
| 9,551,574 B2 | 1/2017 | Silberberg | |
| 2012/0151785 A1 * | 6/2012 | Lettkeman | G01C 9/24 |
| | | | 33/301 |
| 2014/0007439 A1 | 1/2014 | Silberberg | |
| 2015/0096182 A1 | 4/2015 | Silberberg | |
| 2015/0300818 A1 * | 10/2015 | De Cino | G01C 9/34 |
| | | | 33/301 |
| 2015/0308820 A1 * | 10/2015 | Silberberg | G01C 9/28 |
| | | | 33/371 |
| 2016/0025490 A1 * | 1/2016 | Hoppe | G01C 9/26 |
| | | | 33/381 |
| 2017/0328711 A1 * | 11/2017 | Burge | G01C 9/02 |
| 2019/0257649 A1 * | 8/2019 | Cochran | G01C 9/34 |

* cited by examiner

ARTICULATING LEVEL SYSTEMS

CROSS-REFERENCE TO RELATED APPLICATIONS

The present application is related to and claims priority from prior provisional application Ser. No. 62/872,698, filed Jul. 10, 2019, titled "ARTICULATING LEVEL SYSTEMS", the contents of all of which are incorporated herein by this reference and are not admitted to be prior art with respect to the present invention by the mention in this cross-reference section.

DETAILED DESCRIPTION

The present disclosure relates generally to tools used in the construction industry. More particularly, this disclosure concerns a specially designed bubble level having an articulating portion that may be used to verify that an angle made in a tubular structure for example, electrical conduit, is level. The level apparatus of the present disclosure may also be used to verify the angular displacement of the tubular structure about a bend, using a reference level. Thus, the apparatus is particularly useful during manual bending of electrical conduit and similar field-modified tubular structures as the apparatus provides a convenient and readily-discernible indication when a tubular structure that is being bent has been brought to a predetermined bend angle.

Figure 1:
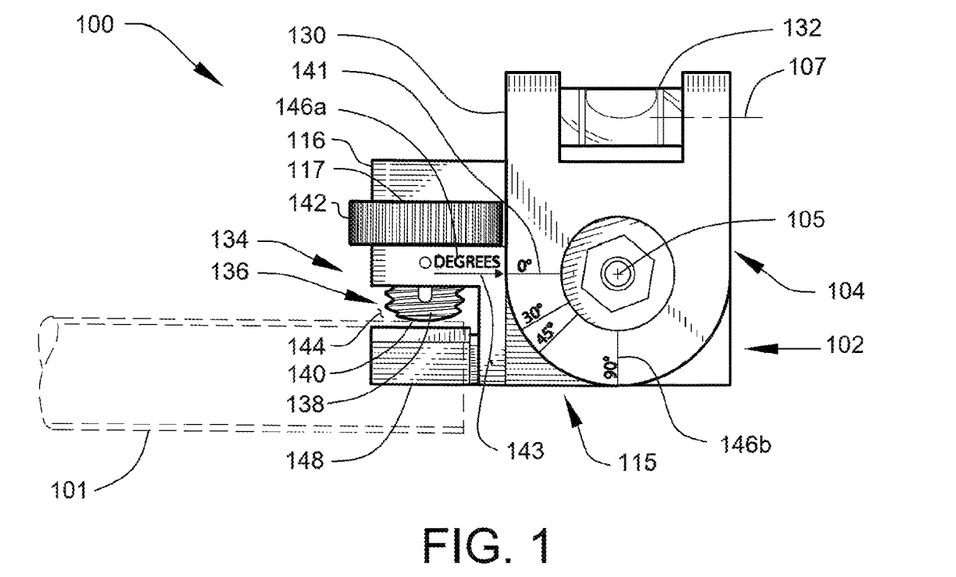
FIG. 1 shows a front view, illustrating an articulating level in a first "in-use" condition.

Referring now more specifically to the drawings by numerals of reference, there is shown in FIG. 1 through FIG. 19, various views of an articulating level 100. FIG. 1 shows the articulating level 100 during a first "in-use" condition where a bubble level may be used to confirm if the angular displacement of a bend in a tubular structure 101 corresponds to a selected angle of a user-selectable angle setting 115 of the articulating level 100.

According to one implementation of the present disclosure, the articulating level 100 includes a first body portion 102 and a second body portion 104, as shown. The first body portion 102 and the second body portion 104 are rotationally coupled such that the second body portion 104 can articulate about an axis-of-rotation 105, relative to the first body portion 102, thus allowing adjustment of the respective body portions to multiple angles having degrees between zero and ninety. Angular displacements between the first body portion 102 and the second body portion 104, corresponding to preset user-selectable angle settings 115 of the articulating level 100, are indicated by reference indicia 146a applied to the first body portion 102 and reference indicia 146b applied to the second body portion 104, as shown.

The second body portion 104 includes a vial chamber 130 containing a bubble vial 132. The vial chamber 130 is arranged within the second body portion 104 such that the longitudinal axis 107 of the bubble vial 132 is held in a fixed parallel orientation with the zero-degree axis 141 of the second body portion 104. Thus, readings from the bubble vial 132 may be used as a reference in determining the true angular orientation of the zero-degree axis 141 and the other user-selectable angle settings 115 of the apparatus, when selected.

The bubble vial 132 (also commonly referred to as a spirit level) may be a cylindrical liquid-filled vial of conventional design. A bubble vial 132 suitable for use in the presently disclosed implementation of the present disclosure comprises a diameter of about 8 millimeters and a length of about 22.4 millimeters. Those with ordinary skill in the art will now appreciate that upon reading this specification and by their understanding the art of bubble vials and spirit levels, as described herein, methods of implementing and operating such devices will be understood by those knowledgeable in such art.

The first body portion 102 includes a first end portion 116, the first end portion 116 having a first slot 117, as shown. The first body portion 102 further includes a connector mechanism 134 integrated within the first body portion 102 proximate a first end portion 116, as shown. The connector mechanism 134 functions to releasably interconnect the articulating level 100 to the tubular structure 101 to allow accurate angular measurements to be performed. The above-described structures and arrangements disclose a connection system to connect the level to the electrical conduit or structure.

The connector mechanism 134 comprises a structure-engaging member 136 that functions to hold the articulating level 100 and the tubular structure 101 in a fixed geometric arrangement. The structure-engaging member 136 comprises a jackscrew 138 in the form of an elongate, externally threaded bar having a contact tip 140. The structure-engaging member 136 is movable between a first retracted position (see FIG. 17) and a second advanced position (see FIG. 18 and FIG. 20). The connector mechanism 134 also includes an operating member that is operably associated with the structure-engaging member 136 for moving the structure-engaging member 136 from the first position to the second position. The operating member of the present disclosure takes the form of a rotatable, internally threaded finger-engaging member 142 that is threadably coupled with the jackscrew 138 of the structure-engaging member 136. The finger-engaging member 142, which in the present disclosure comprises a generally circular shaped thumb wheel, is rotatably mounted within the first slot 117 formed in the first end portion 116 of the first body portion 102, as shown. The circumference of the thumb wheel is preferably knurled to facilitate easy rotation of the thumb wheel relative to the externally threaded structure-engaging member 136 to assist controlled advancement of the contact tip 140 of the structure-engaging member 136 into a second slot 144 that is formed in the first end portion 116 of the first body portion 102. Rotation of the thumb wheel advances the jackscrew 138 into engagement with the tubular structure 101. The first body portion 102 includes a conduit positioning member 148 located at the base of the second slot 144, as shown. The conduit positioning member 148 is adapted to engage the interior of the tubular structure 101 during use. The conduit positioning member 148 provides a rigid backing to allow the tubular structure 101 to be firmly clamped by the contact tip 140 of the jackscrew 138. The connector mechanism 134 and the conduit positioning member 148 are configured to cooperatively align and maintain the tubular structure 101 in an orientation parallel to the tube alignment axis 143 of the first body portion 102 when the tubular structure 101 is retained in the second slot 144. Specific features of the apparatus used to implement such alignment will be described in greater detail below.

During use, the end of the tubular structure 101 is inserted into the second slot 144 in the manner shown in FIG. 1 through FIG. 4 and is held in position while the thumb wheel of the finger-engaging member 142 is rotated in a manner to cause the structure-engaging member 136 to advance into a position wherein the contact tip 140 of the structure-engaging member 136 moves into secure clamping engagement with the tubular structure 101. Although the tubular structure 101 of FIG. 1 is depicted diagrammatically as an electrical conduit segment, it is noted that the articulating level 100 will accommodate a wide range of conduits, channels, angles, pipes, and the like.

According to one implementation of the present disclosure, the articulating level 100 comprises a plurality of user-selectable angle settings 115 capable of articulating among at least three preset angles. The number of user-selectable angle settings 115 may be increased. For example, in the implementation shown in FIG. 1, four preset angles are shown. In the first "in-use" condition of FIG. 1, the user-selectable angle setting 115 of the articulating level 100 is shown adjusted to a zero-degree relationship with the zero-degree axis 141 of the second body portion 104 aligned with the tube alignment axis 143 of the first body portion 102. Readings from the bubble vial 132 may be used as a reference in determining the true angular orientation of the tube alignment axis 143 when the tube alignment axis 143 is selectively aligned with the zero-degree axis 141. Thus, a user may confirm that the tubular structure 101 is arranged in a level (horizontal) when the bubble vial 132 is centered, as shown.

Figure 2:
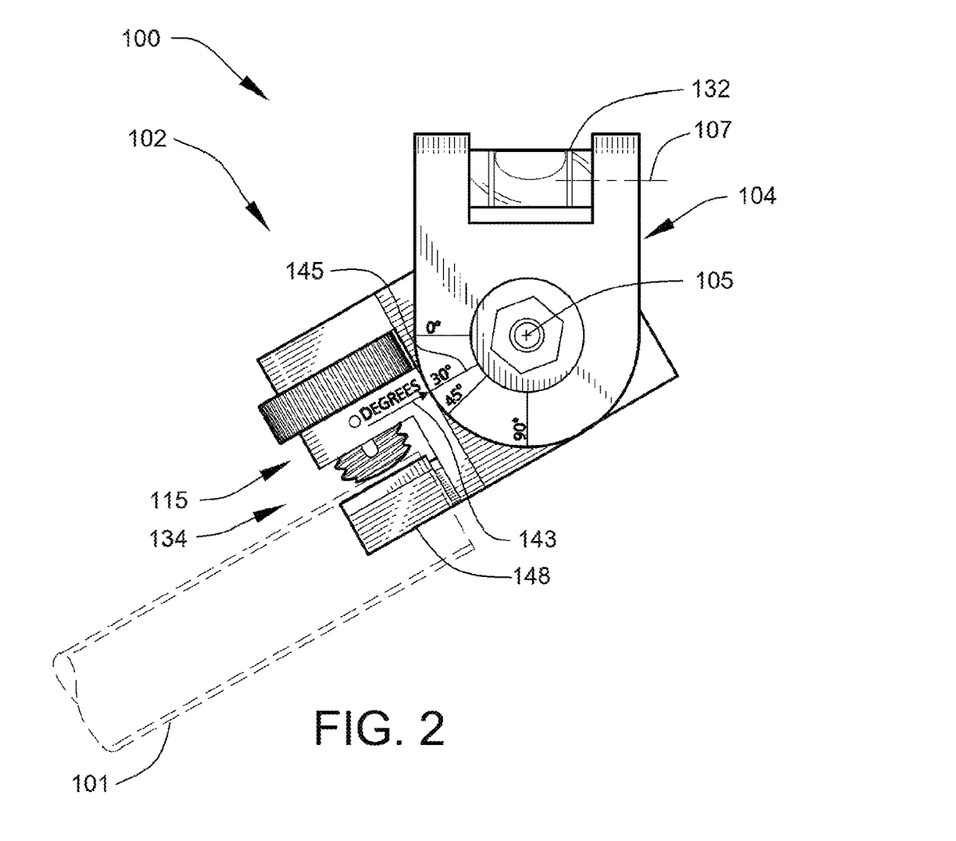
FIG. 2 shows a front view, illustrating the articulating level of FIG. 1 in a second "in-use" condition.

FIG. 2 shows a front view, illustrating the articulating level 100 in a second "in-use" condition. In FIG. 2, the first body portion 102 and the second body portion 104 have been rotationally adjusted to place the user-selectable angle setting 115 at a thirty-degree relationship, with the thirty-degree axis 145 of the second body portion 104 aligned with the tube alignment axis 143 of the first body portion 102. In one implementation, the thirty-degree axis 145 of the second body portion 104 is set at a fixed 30-degree angular displacement relative to the longitudinal axis 107 of the bubble vial 132. Thus, readings from the bubble vial 132 may be used as a reference in determining the true angular orientation of the tube alignment axis 143 when selectively aligned with the thirty-degree axis 145.

In this arrangement, a user may confirm if the tubular structure 101 comprises angular displacement of thirty degrees from level by observing the state of the bubble vial 132. When adjusted, as shown in FIG. 2, the articulating level 100 may be used during a manual bending procedure to indicate when the tubular structure 101 has been brought to the desired a thirty-degree bend angle.

Figures 3, 4:
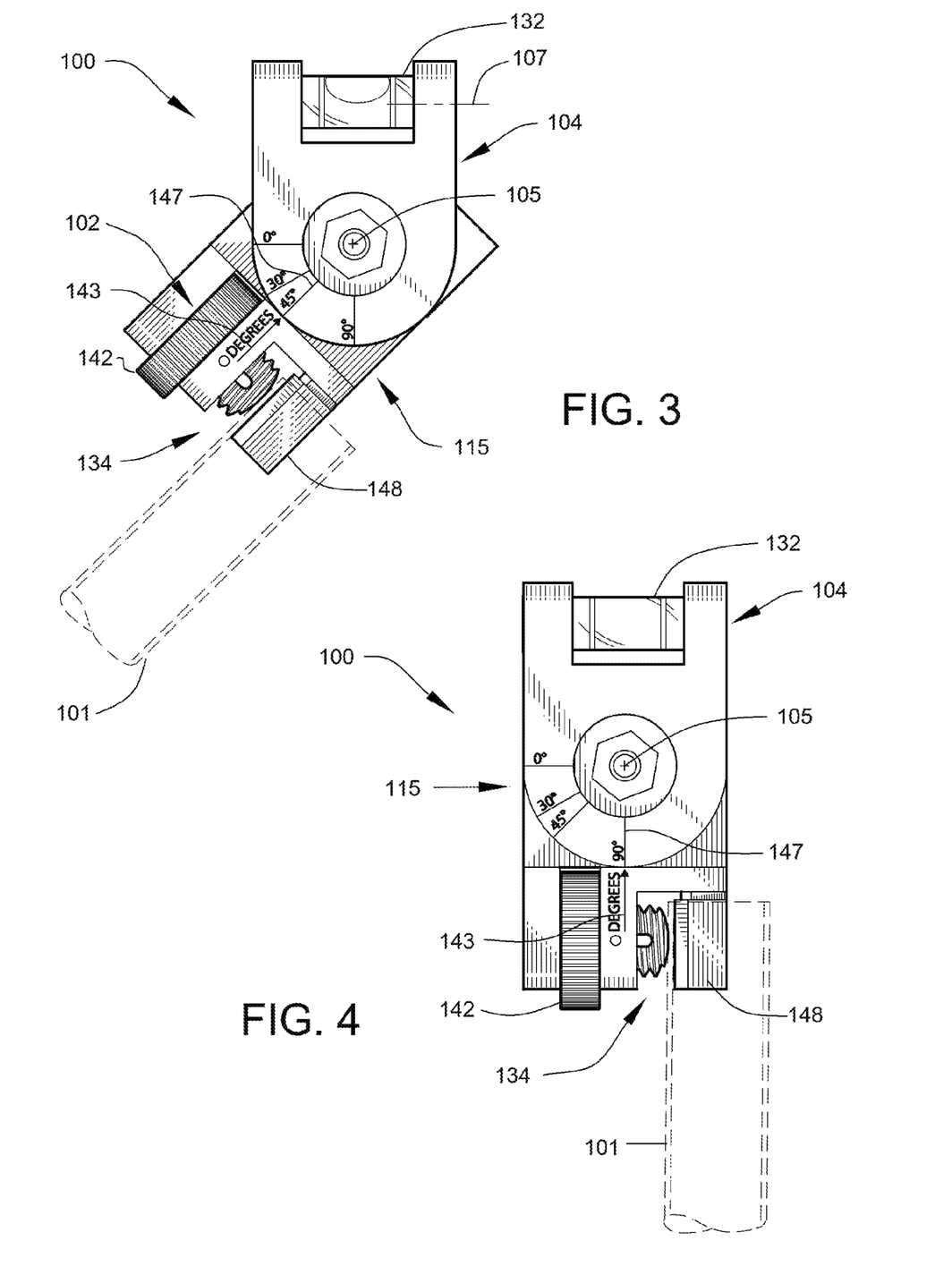
FIG. 3 shows a front view, illustrating the articulating level of FIG. 1 in a third "in-use" condition.
FIG. 4 shows a front view, illustrating the articulating level of FIG. 1 in a fourth "in-use" condition.

FIG. 3 shows a front view, illustrating the articulating level 100 of FIG. 1 in a third "in-use" condition. In FIG. 3, the first body portion 102 and the second body portion 104 have been rotationally adjusted to place the user-selectable angle setting 115 at a forty-five-degree relationship, with the forty-five-degree axis 147 of the second body portion 104 aligned with the tube alignment axis 143 of the first body portion 102. In the present implementation, the forty-five-degree axis 147 of the second body portion 104 is set at a fixed 45-degree angular displacement relative to the longitudinal axis 107 of the bubble vial 132. As above, readings from the bubble vial 132 may be used as a reference in determining the true angular orientation of the tube alignment axis 143 when selectively aligned with the forty-five-degree axis 147.

Thus, a user may confirm if the tubular structure 101 comprises angular displacement of forty-five degrees from level by observing the state of the bubble vial 132. When adjusted, as shown in FIG. 3, the articulating level 100 may be beneficially used during a manual bending procedure to indicate when the tubular structure 101 has been brought to the desired forty-five-degree bend angle.

FIG. 4 shows a front view, illustrating the articulating level in a fourth "in-use" condition. In FIG. 4, the first body portion 102 and the second body portion 104 have been rotationally adjusted to place the user-selectable angle setting 115 at a ninety-degree relationship, with the ninety-degree axis 149 of the second body portion 104 aligned with the tube alignment axis 143 of the first body portion 102, as shown. As above, the ninety-degree axis 149 of the second body portion 104 is set at a fixed 90-degree angular displacement relative to the longitudinal axis 107 of the bubble vial 132. Thus, readings from the bubble vial 132 may be used as a reference in determining the true angular orientation of the tube alignment axis 143 when selectively aligned with the ninety-degree axis 149.

In this arrangement, a user may confirm if the tubular structure 101 is plumb (in a vertical orientation) by observing the bubble vial 132. When adjusted, as shown in FIG. 4, the articulating level 100 may be beneficially used during a manual bending procedure to indicate when the tubular structure 101 is plumb.

Figure 5:
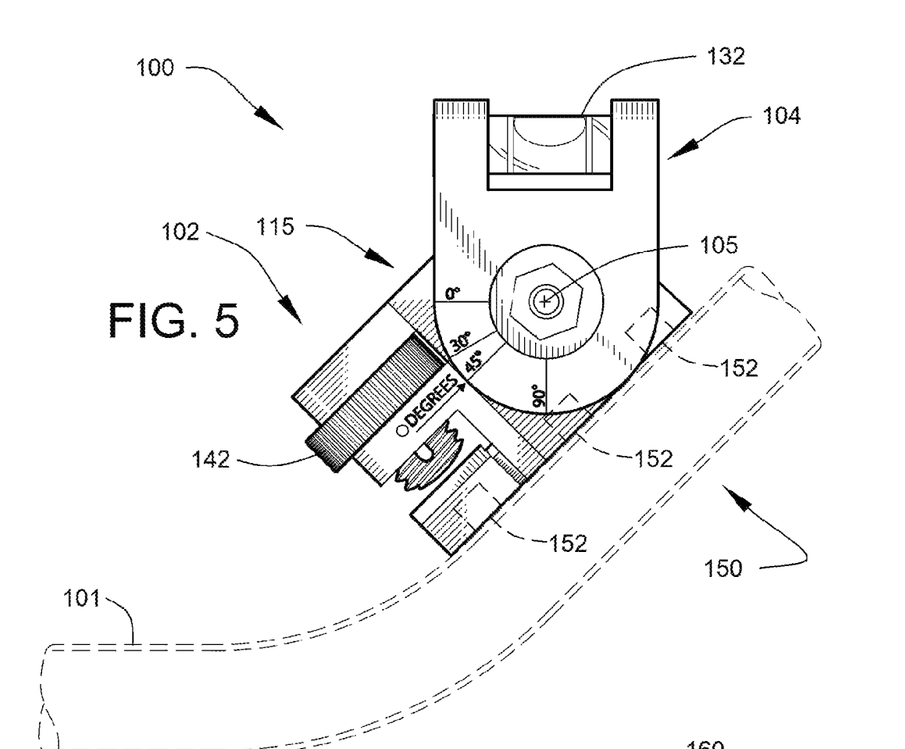
FIG. 5 shows a front view, illustrating the articulating level of FIG. 1 in a fifth "in-use" condition.

FIG. 5 shows a front view, illustrating the articulating level 100 in a fifth "in-use" condition. In this arrangement, the articulating level 100 and the tubular structure 101 are coupled using an alternate magnetic attachment arrangement. The articulating level 100 may include at least one secondary attachment system 150 comprising one or more permanent magnets 152 (see also FIG. 10 and FIG. 13). The permanent magnets 152 are arranged within the first body portion 102 and the second body portion 104 to allow the articulating level 100 to be magnetically coupled to an outer surface of tubular structures constructed from a ferromagnetic material (i.e., ferromagnetic portions), as shown. Permanent magnets 152 suitable for use in the articulating level 100 may include rare-earth neodymium magnets having a diameter and length of about 0.25 inches (6.35 millimeters).

FIG. 6 through FIG. 12 show various views of the articulating level 100. For clarity of description, the user-selectable angle setting 115 of the articulating level 100 is shown in FIG. 6 through FIG. 12 adjusted to the zero-degree relationship with the zero-degree axis 141 of the second body portion 104 aligned with the tube alignment axis 143 of the first body portion 102.

Figure 6:
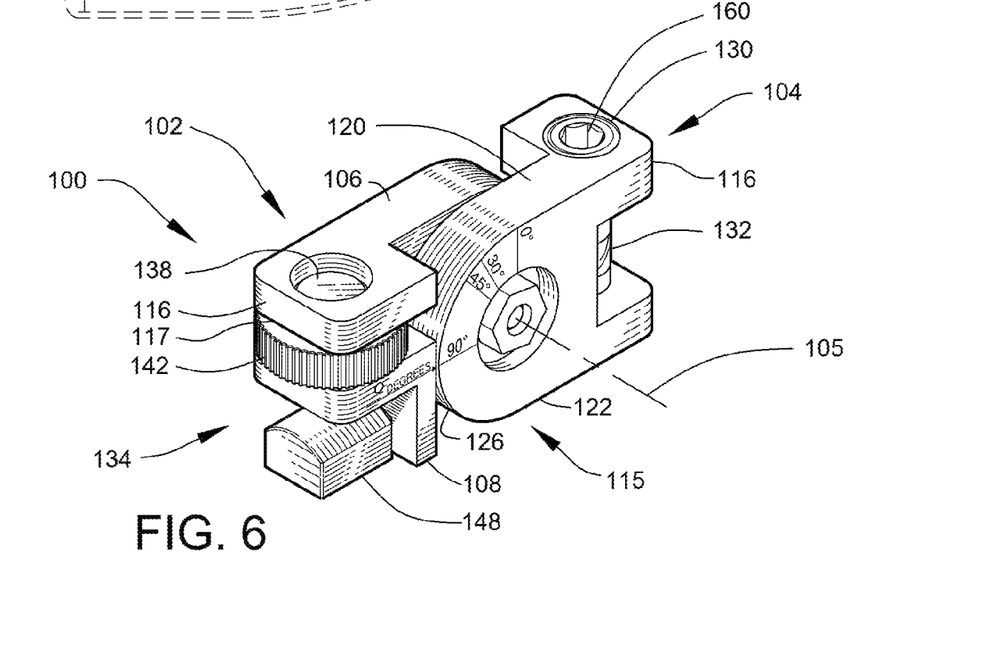
FIG. 6 shows a perspective view of the articulating level of FIG. 1.

FIG. 6 shows a perspective view of the articulating level 100 of FIG. 1. The first body portion 102 includes a top surface 106, a bottom surface 108, a first end portion 116 and a second end portion 118, the first end portion 116 including the first slot 117, as shown. The second body portion 104 includes a top surface 120, a bottom surface 122, a first end portion 124 and a second end portion 126, as shown. The first body portion 102 and the second body portion 104 may be constructed from one or more substantially rigid and durable materials.

As above, the first body portion 102 contains the connector mechanism 134 with the second body portion 104 containing the bubble vial 132. The top of the jackscrew 138 and the finger-engaging member 142 of the connector mechanism 134 are visible as are their respective operable positions within the first body portion 102. The knurled circumferential surface of the finger-engaging member 142 is situated outside of the first slot 117, as shown, to allow direct manual manipulation of the thumb wheel. The conduit positioning member 148 is also visible in FIG. 6, which extends outwardly along the base of the second slot 144, as shown. The axis-of-rotation 105, about which the first body portion 102 and second body portion 104 pivot, is indicated by the transversely oriented dashed line extending through the articulating level 100, as shown.

Figure 7:
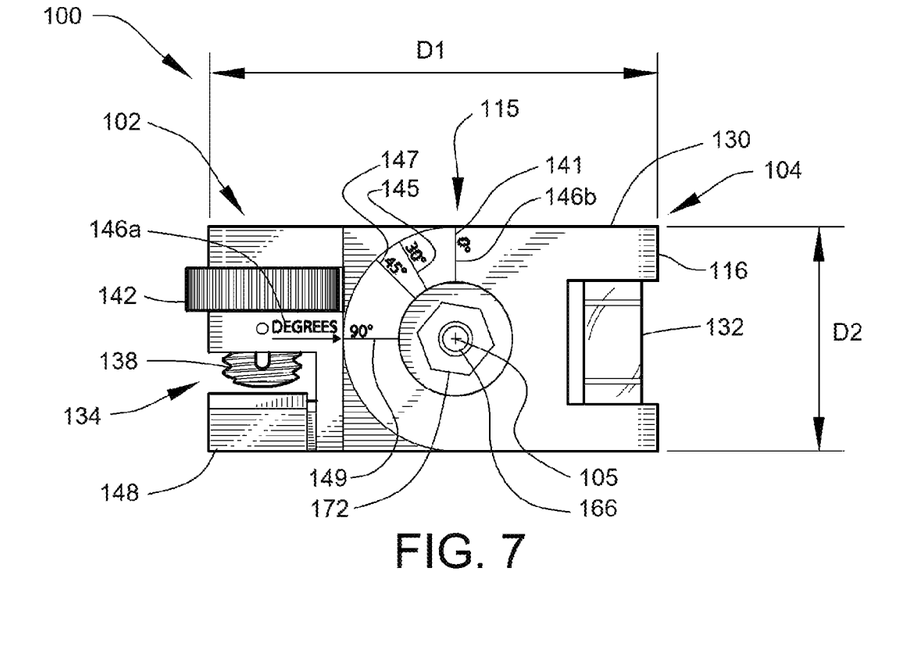
FIG. 7 shows a front view, further illustrating features of the articulating level of FIG. 1.
Figure 8:
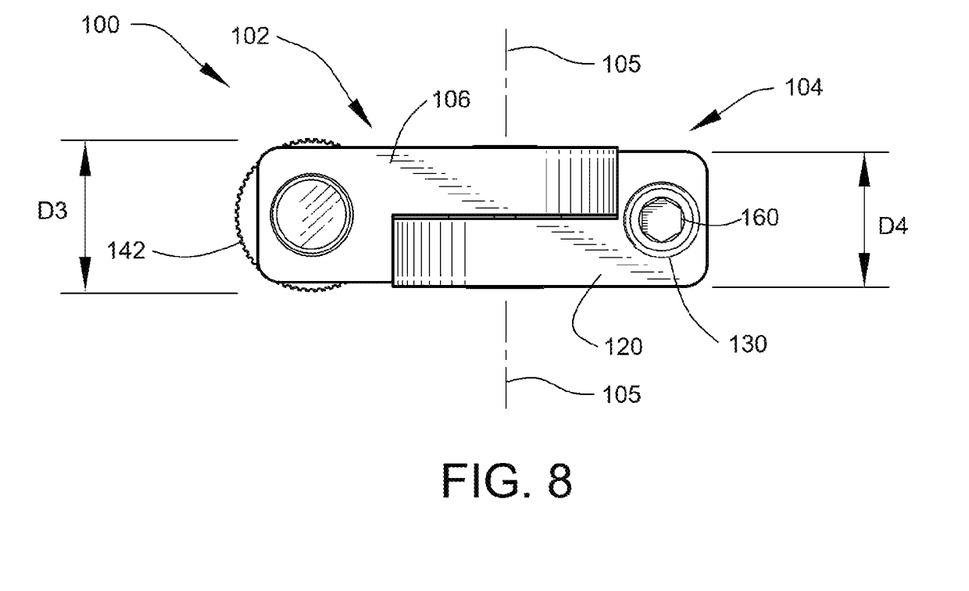
FIG. 8 shows a top view of the articulating level of FIG. 1.

FIG. 7 shows a front view of the articulating level 100. FIG. 8 shows a top view of the articulating level 100 of FIG. 1. According to one implementation of the present disclosure, the articulating level 100 comprises an overall size that permits carrying in a pocket. For example, in one implementation, the articulating level 100 comprises an overall length D1 of about 2.5 inches (63.5 millimeters), an overall height D2 of about 1.5 inches (38 millimeters) and a width D3 of about 0.85 inch (21.6 millimeters), which corresponds to the diameter of the finger-engaging member 142, as shown. The generally L-shaped bodies of both the first body portion 102 and the second body portion 104 comprise a maximum width D4 of about 0.75 inch (19.1 millimeters). Upon reading this specification, it should be appreciated that, under appropriate circumstances, other size arrangements such as, for example, development of larger or smaller apparatus, etc., may be sufficient.

The reference indicia 146a and reference indicia 146b, visible in FIG. 7, are permanently applied to the respective body portions by surface printing, engraving, etching or by other common means. The reference indicia 146b correspond to the zero-degree axis 141, the thirty-degree axis 145, the forty-five-degree axis 147 and the ninety-degree axis 149 of the apparatus.

Figure 9:
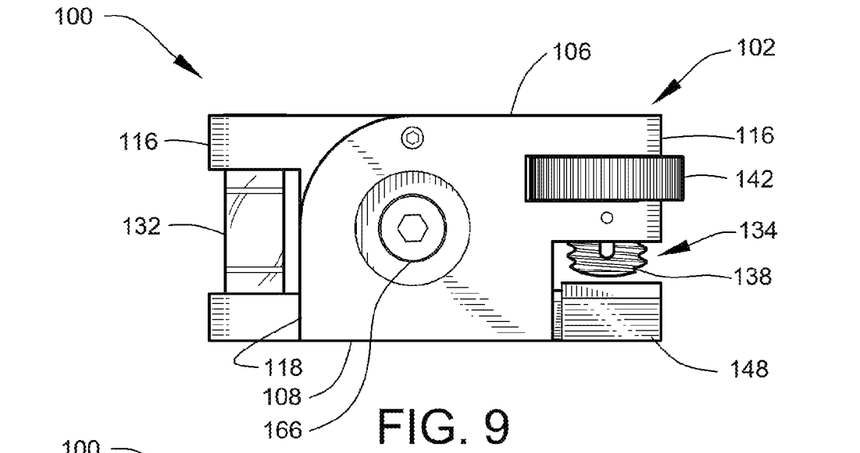
FIG. 9 shows a back view of the articulating level of FIG. 1.

FIG. 9 shows a back view of the articulating level 100, illustrating the opposing rear elevations of the first body portion 102, the connector mechanism 134, the second body portion 104, and the bubble vial 132. Note that the bubble vial 132 is arranged within the second body portion 104 to be visible from the front, the back and at least one end of the apparatus.

Figure 10:
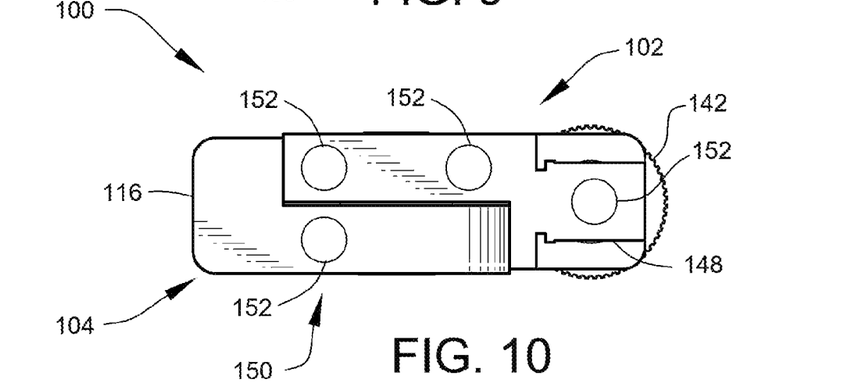
FIG. 10 shows a bottom view of the articulating level of FIG. 1.

The set of permanent magnets 152 forming the secondary attachment system 150 are best seen in the bottom view of FIG. 10. According to one implementation of the present disclosure, the articulating level 100 includes four permanent magnets 152, as shown. In the arrangement shown in FIG. 19, three of the magnets are inset within the bottom surface 108 of the first body portion 102 with the fourth inset within the bottom surface 122 of the second body portion 104, as shown.

The connector mechanism 134 and the conduit positioning member 148 are configured to cooperatively align the tubular structure 101 (see FIG. 1) and the apparatus in a fixed geometric relationship and to and maintain the relationship during use. Similarly, the set of permanent magnets 152 forming the secondary attachment system 150 configured to cooperatively align the tubular structure 101 (see FIG. 1) and the apparatus in a fixed geometric relationship and to and maintain the relationship during use.

Figure 11:
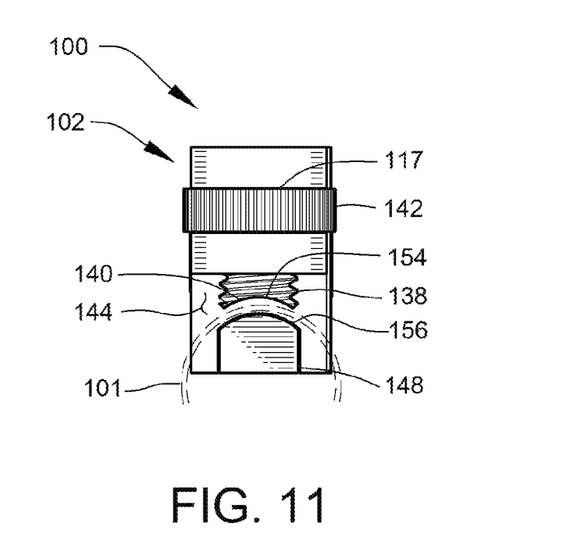
FIG. 11 shows a first end view of the articulating level of FIG. 1.

Referring to the end view of FIG. 11, a contact tip 140 of the jackscrew 138 includes a concave-surface portion 154 that generally matches the convex surface of the tubular structure 101, as shown. The conduit positioning member 148 of the first body portion 102 includes a similar convex-surface portion 156, the concave-surface portion 154 of the contact tip 140 and the convex-surface portion 156 of the first body portion 102 cooperating to releasably retain the convex surface of the tubular structure 101 therebetween. Moreover, the concave-surface portion 154 of the contact tip 140 and the convex-surface portion 156 of the first body portion 102 function to properly align the tubular structure 101 and the apparatus in a fixed geometric relationship permitting the angular displacement measurement to be performed.

Figure 12:
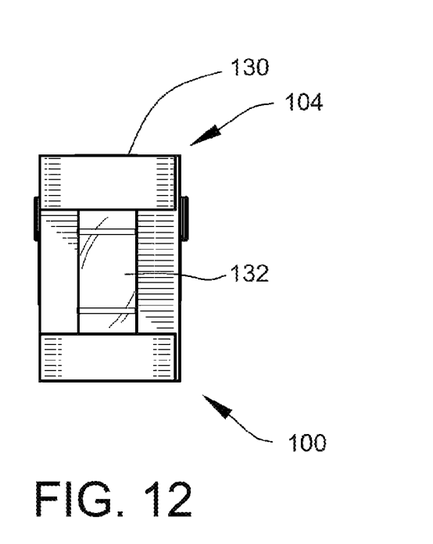
FIG. 12 shows a second end view of the articulating level of FIG. 1, the second end view opposite the first.

FIG. 12 shows a second end view of the articulating level 100 further illustrating placement of the bubble vial 132 within the second body portion 104. As above, the placement of the bubble vial 132 affords an unobstructed 180-degree view of the bubble vial 132 during use. More specifically, the bubble level is viewable is exposed on at least three sides to assist viewing from at least three distinct directions. The bubble vial 132 is secured within the level body in a manner that if the bubble vial 132 becomes broken or otherwise damaged, it can be easily replaced (as best shown in FIG. 13) and the apparatus need not be discarded.

Figure 13:
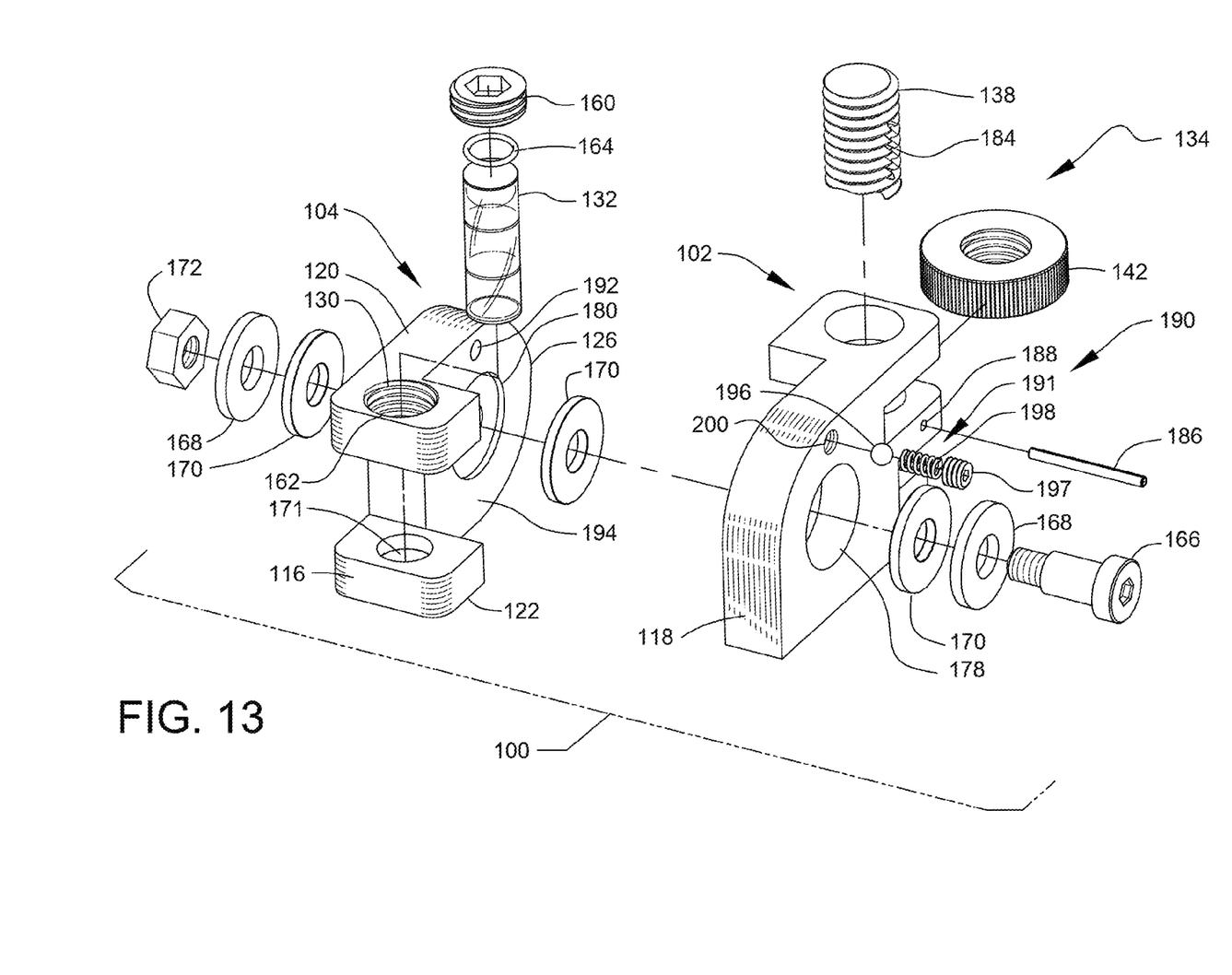
FIG. 13 shows an exploded view of the articulating level of FIG. 1.
Figure 14:
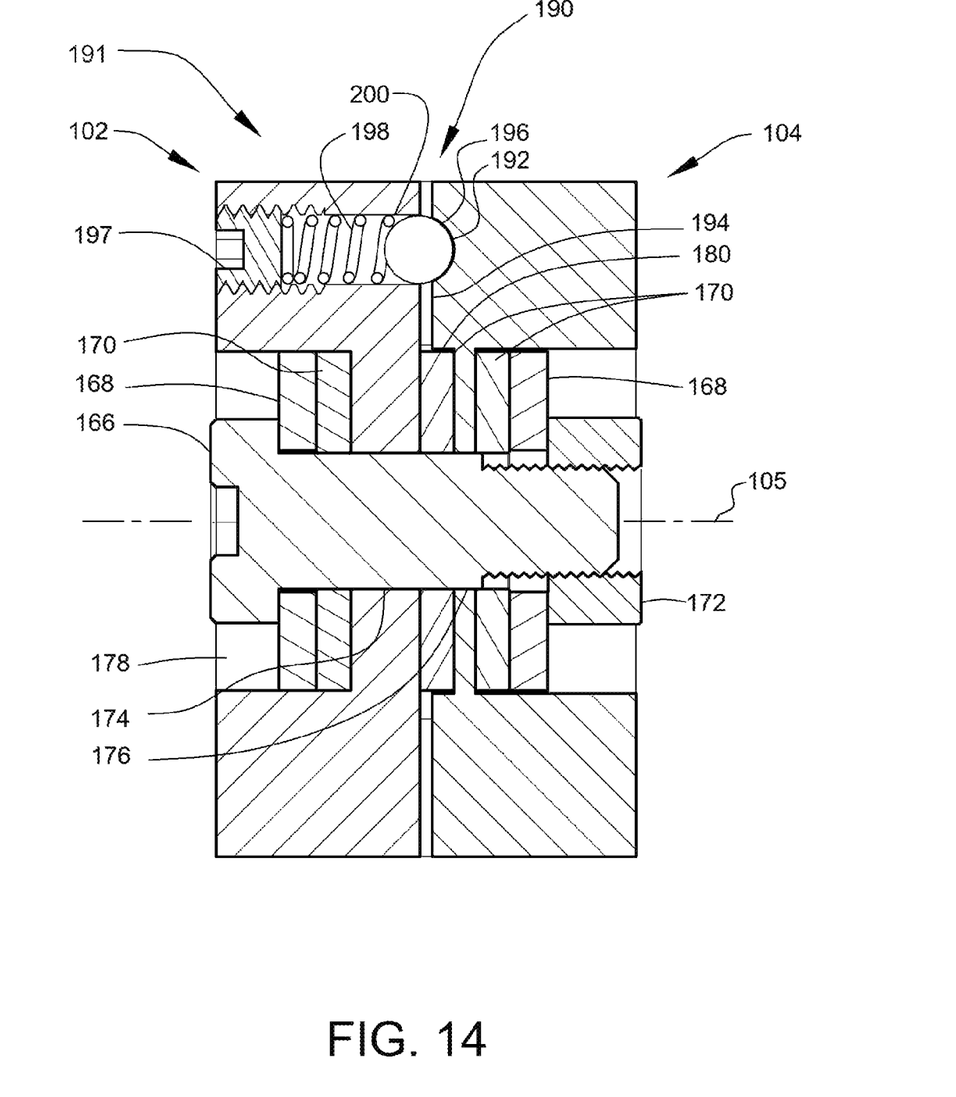
FIG. 14 shows a sectional view, through the section 14-14 of FIG. 9, illustrating various arrangements of the articulating level of FIG. 1.
Figures 15, 16:
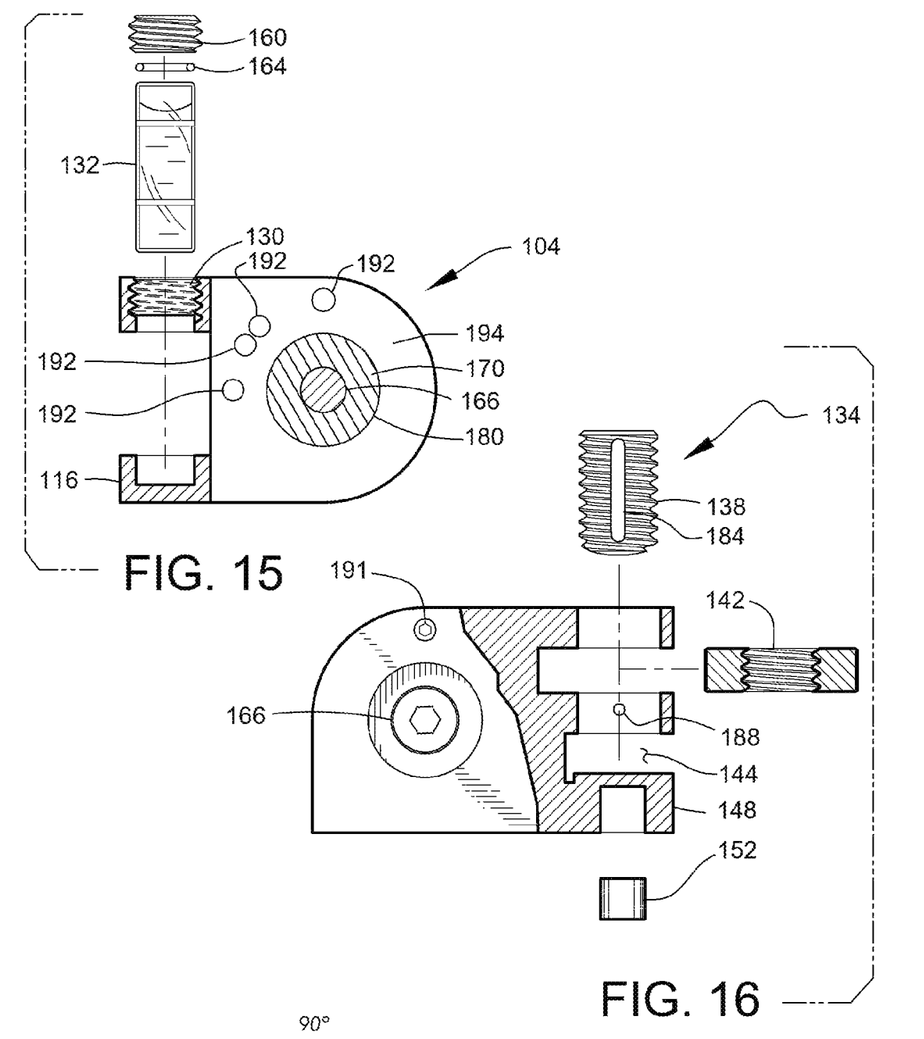
FIG. 15 shows an exploded view, in partial section, illustrating a second body portion of the articulating level of FIG. 1.
FIG. 16 shows an exploded view, in partial section, illustrating a first body portion of the articulating level of FIG. 1.
Figure 17:
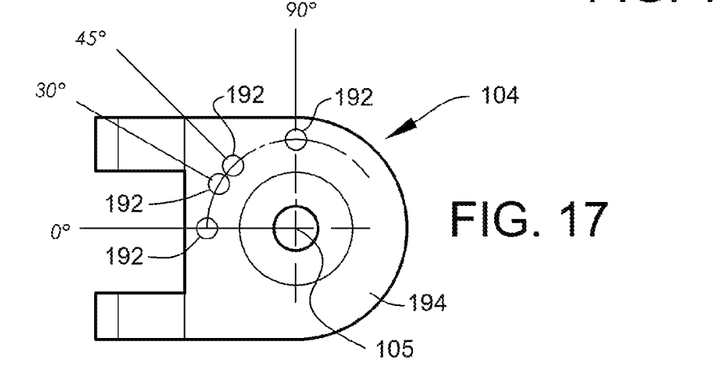
FIG. 17 shows a side view, illustrating arrangements of the second body portion of FIG. 1

FIG. 13 shows an exploded view, illustrating the primary subcomponents of the articulating level 100. FIG. 14 shows a sectional view, through the section 14-14 of FIG. 9, illustrating internal arrangements of the articulating level 100. FIG. 15 shows an exploded view, in partial section, illustrating the second body portion 104 of the articulating level 100 of FIG. 1.

As above, the bubble vial 132 is removably retained within the vial chamber 130 formed within the second body portion 104, as shown. The vial chamber 130 arrangements include a threaded opening 162 and a threaded vial retainer 160 receivable within the threaded opening 162. The threaded vial retainer 160 is configured to secure the bubble vial 132 within the vial chamber 130 when the threaded vial retainer 160 is received within the threaded opening 162. A shallow bore 171 formed within the second body portion 104 is used to capture the distal end of the bubble vial 132. A resilient O-ring 164 is located between the proximal end of the bubble vial 132 and the threaded vial retainer 160 to protect the bubble vial 132 from shock and compression damage. According to one implementation of the present disclosure, the threaded vial retainer 160 comprises an 8-32 stainless steel set screw with an Allen-wrench socket.

According to one implementation of the present disclosure, the first body portion 102 and the second body portion 104 are rotationally coupled by a pivot assembly consisting of a shouldered bolt 166, a set of steel washers 168, a set of nylon thrust bearings 170, and a nylon-insert lock nut 172. The shouldered bolt 166 is disposed in a set of bores 174, 176 formed respectively in the first body portion 102 and the second body portion 104, the bores are arranged coaxially with the axis-of-rotation 105, as shown. A first steel washer 168 and a nylon thrust bearing 170 are disposed on the headed end of the shouldered bolt 166, as shown. A partial bore 178 formed in the second body portion 104 allows the first steel washer 168, the nylon thrust bearing 170, and head of the shouldered bolt 166 to reside in a recessed position within the second body portion 104.

An intermediate nylon thrust bearing 170 is disposed on the shouldered bolt 166 in a position between the first body portion 102 and the second body portion 104, as shown. A shallow bore 180 is formed in the first body portion 102 to allow the intermediate nylon thrust bearing 170 to reside in a partially recessed position, as shown.

A second steel washer 168 and a third nylon thrust bearing 170 are disposed on the threaded end of the shouldered bolt 166, as shown. The nylon-insert lock nut 172 is engaged on the shouldered bolt 166 to secure the assembly in place. A partial bore 182 formed in the first body portion 102 allows the second steel washer 168, the third nylon thrust bearing 170, and the nylon-insert lock nut 172 to reside in a recessed position within the first body portion 102.

According to one implementation of the present disclosure, the shouldered bolt 166 comprises a smooth-shaft diameter of about 0.25-inch, a threaded end comprising 10-32 UNC threads and is preferably constructed from stainless steel. The steel washers 168 comprise an outer diameter of about 0.625 inch (16 millimeters), a thickness of about 0.06 inch (1.5 millimeters) and are preferably constructed from stainless steel. The nylon thrust bearings 170 comprise an outer diameter of about 0.625 inch and comprise a thickness of about 0.0625 inch.

The articulating level 100 includes a pivot retainer mechanism 190 functioning to releasably retain the user-selectable angle setting 115 at a user-selected angle. More specifically, the pivot retainer mechanism 190 is engaged between the first body portion 102 and the second body portion 104 to releasably retain the first body portion 102 and the second body portion 104 in a selected one of the four user-selectable angle settings 115. According to one implementation of the present disclosure, the pivot retainer mechanism 190 is a spring ball detent mechanism 191 including a plurality of detent impressions 192 (see FIG. 14, FIG. 15, FIG. 17) formed in the interior surface 194 of the second body portion 104 in circumferentially spaced relation about the axis-of-rotation 105 and the shouldered bolt 166. The detent impressions 192 are located at the angular positions corresponding to the zero-degree axis 141, the thirty-degree axis 145, the forty-five-degree axis 147, and the ninety-degree axis 149 of the apparatus. The detent mechanism 191 includes a detent ball 196 (see FIG. 13, FIG. 14), which is resiliently urged by the detent spring 198 toward the detent impressions 192 of the interior surface 194. The detent ball 196 is radially spaced from the axis-of-rotation 105 to enable the detent ball 196 to releasably engage a detent impression 192 corresponding to a selected one of the four selectable angular positions of the apparatus, the detent impressions 192 and the detent ball 196 cooperating to releasably retain the first body portion 102 and the second body portion 104 in the selected one of the at least four angular positions associated with the zero-degree axis 141, the thirty-degree axis 145, the forty-five-degree axis 147 and the ninety-degree axis 149 of the apparatus. Those with ordinary skill in the art will now appreciate that upon reading this specification and by their understanding the art of spring ball detent mechanisms as described herein, the placement of the detent impressions relative to the ball to achieve the angular positions of the axes noted above, will be understood by those knowledgeable in such art.

According to one implementation of the present disclosure, the detent spring 198 is located in a bore 200 (see FIG. 13, FIG. 14) extending through the first body portion 102 at an orientation generally perpendicular to the interior surface 194. A threaded set screw 197 is used to retain the detent spring 198 within the bore 200. The detent mechanism 191 allows the first body portion 102 and the second body portion 104 to be snapped sequentially into the four selectable angular positions. Upon reading this specification, it should be appreciated that, under appropriate circumstances, providing a user-selectable angle setting at 22.5 degrees, implementing a greater or lesser quantity of angle settings, etc., may be sufficient.

FIG. 16 shows an exploded view, in partial section, of the first body portion 102 and arrangements and the connector mechanism 134. Referring to FIG. 16, with continued reference to FIG. 13, the jackscrew 138 of the connector mechanism 134 is provided with a longitudinally extending slot 184 that closely receives a transversely extending guide bar 186, which is operably associated with the translational movement of the jackscrew 138 within the first body portion 102. More particularly, the guide bar 186 is disposed within a transverse bore 188 that extends through first body portion 102 in a position between the first slot 117 and the second slot 144. With this construction, the guide bar 186 extends through the slot 184 and functions to prevent rotation of the jackscrew 138 during the manual turning of the finger-engaging member 142 and assists in guiding the jackscrew 138 as it travels in and out of slot 144.

According to one implementation of the present disclosure, the externally-threaded jackscrew 138 comprises a diameter of about 0.44 inch, a length of about 0.69 inch and is constructed of 360 brass. The finger-engaging member 142, which in the present disclosure comprises a generally circular-shaped thumb wheel, comprises a diameter of about 0.85 inch, a thickness of about 0.25 inch and is also constructed of 360 brass.

Figure 18:
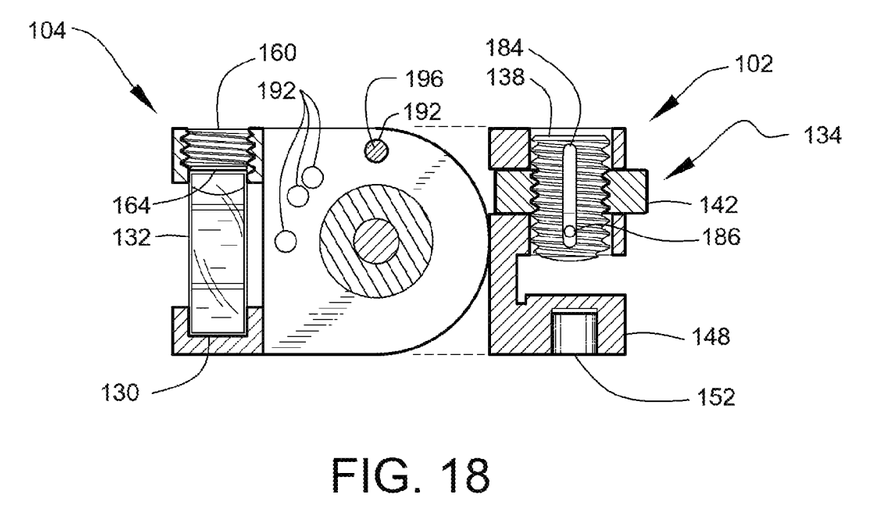
FIG. 18 shows a sectional view, through the section 18-18 of FIG. 8, further illustrating internal arrangements of the articulating level of FIG. 1.

FIG. 18 shows a sectional view, through the section 18-18 of FIG. 8, further illustrating the internal arrangements of the articulating level 100 of FIG. 1.

Figure 19:
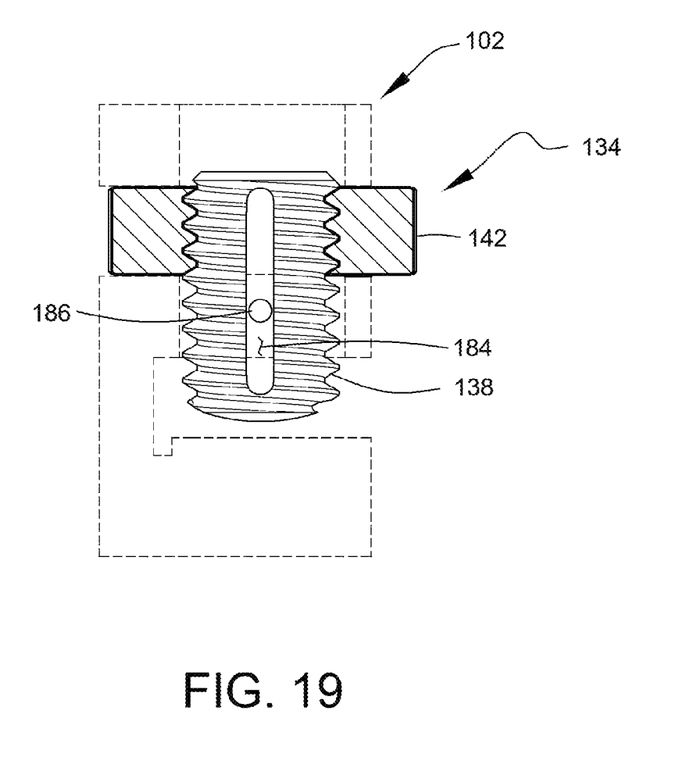
FIG. 19 is a front view, in partial section, illustrating arrangements of a connector mechanism of the articulating level of FIG. 1.

FIG. 19 is a front view, in partial section, further illustrating the subcomponent arrangements of the connector mechanism 134. For clarity of description, the jackscrew 138, the finger-engaging member 142, and the guide bar 186 are shown isolated from the first body portion 102. As above, the guide bar 186 extends through the slot 184 to prevent rotation of the jackscrew 138 during the manual turning of the finger-engaging member 142 and to assist in guiding the jackscrew 138 as it translates within the first body portion 102 to contact the tubular structure 101.

Upon reading this specification, it should be appreciated that, under appropriate circumstances, other system arrangements such as, for example, including instructions detailing the functional operation in relation to the structures of the articulating level (such that the articulating level can be used, maintained, or the like, in a preferred manner), utilizing electronic angle-measurement devices, etc., may be sufficient.

Figure 20:
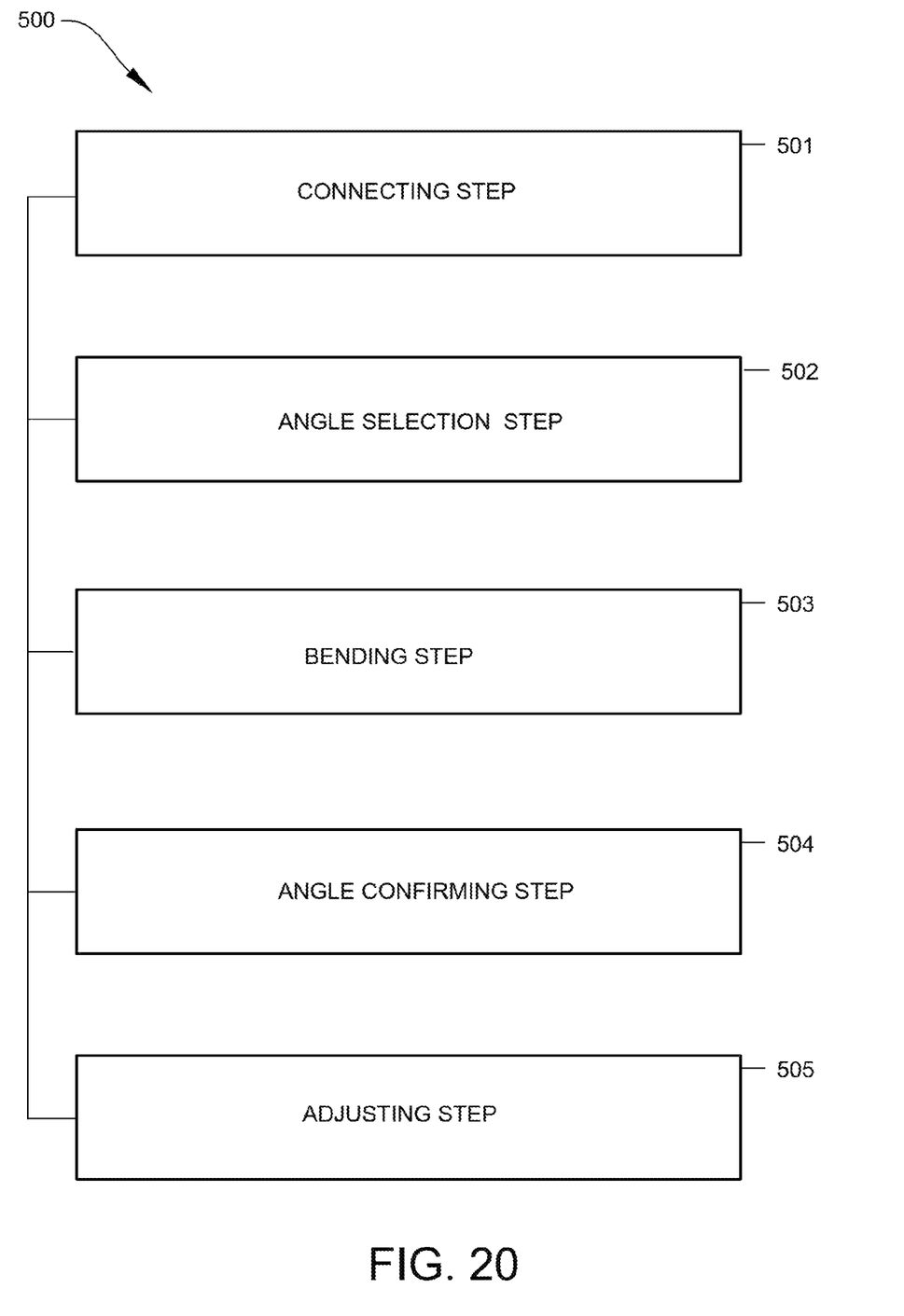
FIG. 20 is a flow diagram illustrating a method of determining the angular displacement of a bend in an electrical conduit after bending.

FIG. 20 is a flow diagram illustrating a method 500 of determining the angular displacement of a bend in an electrical conduit after bending. As illustrated, the method 500 may include the steps of: step one 501, connecting an articulating level comprising a bubble level, an angle reading selector to the electrical conduit; step two 502, selecting an angle of the angle reading selector to an angle that corresponds to the desired angle bend of the electrical conduit; step three 503, bending the electrical conduit to the desired angle; step four 504, confirming that the electrical conduit is at the desired angle using the bubble level; step five 505, adjusting the bend in the electrical conduit, if needed, and confirming that the electrical conduit is at the desired angle using the bubble level.

It should be noted that step 505 is an optional step and may not be implemented in all cases. It should also be noted that the steps described in method 500 can be carried out in many different orders according to user preference.

Although applicant has described various implementations of applicant's invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A level to assist determining orientation of a structure comprising:
    a first body portion having a top surface, a bottom surface and first and second end portions, said first end portion having a first slot;
    a second body portion having a top surface, a bottom surface and first and second end portions, said second body portion having at least one vial chamber;
    a bubble vial disposed within said at least one vial chamber;
    said first body portion and said second body portion are rotationally coupled permitting said second body portion to articulate about an axis-of-rotation, relative to said first body portion, to multiple degrees between zero and ninety degrees;
    said first body portion comprising a connector mechanism connected to said first body portion proximate said first end portion thereof for releasably interconnecting said first body portion with the structure, said connector mechanism comprising a structure engaging member comprising a threaded member having a contact tip, said threaded member movable between a first position and a second position and an operating member comprising a rotatable finger engaging member threadably interconnected with said threaded member and receivable within said first slot of said first end portion of said first body portion and being operably associated with said structure engaging member to move said structure engaging member from said first position to said second position;
    said contact tip including a concave-surface portion to match a convex surface of the structure; and
    said first body portion including a convex-surface portion, said concave-surface portion of said contact tip and said convex-surface portion of said first body portion cooperating to releasably retain the convex surface of the structure therebetween.

2. The level of claim 1, said at least one vial chamber comprising a threaded opening and a threaded vial retainer receivable within said threaded opening, and said threaded vial retainer secures said bubble vial within said at least one vial chamber when said threaded vial retainer is received within said threaded opening.

3. The level of claim 1, said second body portion articulates, relative to said first body portion, among at least four angles.

4. The level of claim 3, said level comprising a pivot retainer engaged between said first body portion and said second body portion and releasably retaining said first body portion and said second body portion in a user-selected angles of said at least four angles, said pivot retainer including
    a plurality of detent impressions formed in said second body portion, said detent impressions being circumferentially spaced about said axis-of-rotation in respective positions corresponding to said at least four angles;
    a detent ball resiliently mounted to said first body portion and resiliently urged toward said detent impressions, said detent ball being radially spaced from said axis of rotation to enable said detent ball to releasably engage a detent impression corresponding to a user-selected angle of one of said at least four angles; and
    said detent impressions and said detent ball cooperating to releasably retain said first body portion and said second body portion in such selected one of said at least four angles.

5. The level of claim 1, said second body portion articulates, relative to said first body portion, at zero degrees, thirty degrees, forty-five degrees, and ninety degrees.

6. The level of claim 1, said bubble vial is exposed on at least three sides to assist viewing from at least three distinct directions.

7. The level of claim 1 further comprising at least one secondary attachment system, said at least one secondary attachment system comprising at least one permanent magnet to magnetically couple the level to a ferromagnetic portion of the structure.

8. The level of claim 1, the structure being a tubular structure.

9. The level of claim 1, the structure being electrical conduit.

10. The level of claim 1, said second body portion articulates, relative to said first body portion, among at least three angles.

11. A method of determining angular displacement of a bend in electrical conduit after bending comprising the steps of:
    connecting an apparatus to electrical conduit, the apparatus comprising
        a first body portion having a top surface, a bottom surface and first and second end portions, said first end portion having a first slot;

a second body portion having a top surface, a bottom surface and first and second end portions, said second body portion having at least one bubble level chamber;

a bubble level disposed within said at least one bubble level chamber;

said first body portion and said second body portion are rotationally coupled permitting said second body portion to articulate about an axis-of-rotation, relative to said first body portion, to multiple degrees between zero and ninety degrees;

said first body portion comprising a connector mechanism connected to said first body portion proximate said first end portion thereof for releasably interconnecting said first body portion with the structure, said connector mechanism comprising a structure engaging member comprising a threaded member having a contact tip, said threaded member movable between a first position and a second position and an operating member comprising a rotatable finger engaging member threadably interconnected with said threaded member and receivable within said first slot of said first end portion of said first body portion and being operably associated with said structure engaging member to move said structure engaging member from said first position to said second position;

said contact tip including a concave-surface portion to match a convex surface of the structure; and said first body portion including a convex-surface portion, said concave-surface portion of said contact tip and said convex-surface portion of said first body portion cooperating to releasably retain the convex surface of the structure therebetween;

selecting an angle rotating said second body portion to an angle that corresponds to a desired angle bend of the electrical conduit;

bending the electrical conduit to the desired angle; and confirming that the electrical conduit is at the desired angle using the bubble level of said second body portion.

12. The method of claim 11 comprising the step of adjusting the bend of the electrical conduit, if needed, and confirming that the electrical conduit is at the desired angle using the bubble level.

\* \* \* \* \*